(12) United States Patent
Tokuda et al.

(10) Patent No.: US 8,522,619 B2
(45) Date of Patent: Sep. 3, 2013

(54) PRESSURE SENSOR (75) Inventors: Tomohisa Tokuda, Tokyo (JP); Hirofumi Tojo, Tokyo (JP); Nozomi Kida, Tokyo (JP)

(73) Assignee: Azbil Corporation, Tokyo (JP)

( * ) Notice: Subject to any disclaimer, the term of this patent is extended or adjusted under 35 U.S.C. 154(b) by 117 days.

(21) Appl. No.: 13/085,837

(22) Filed: Apr. 13, 2011

(65) Prior Publication Data

US 2011/0247422 A1    Oct. 13, 2011

(30) Foreign Application Priority Data

Apr. 13, 2010  (JP) ................. 2010-092429

(51) Int. Cl.
*G01L 7/02* (2006.01)
(52) U.S. Cl.
USPC .............................. 73/716; 73/736
(58) Field of Classification Search
USPC .................................. 73/700–756
See application file for complete search history.

(56) References Cited

U.S. PATENT DOCUMENTS

| | | | |
|---|---|---|---|
| 5,259,248 A | | 11/1993 | Ugai et al. |
| 5,485,000 A | * | 1/1996 | Schneider ............ 235/494 |
| 2005/0172723 A1 | | 8/2005 | Kato et al. |
| 2010/0083765 A1 | * | 4/2010 | Yoneda et al. ........... 73/721 |
| 2010/0083766 A1 | * | 4/2010 | Yoneda et al. ........... 73/721 |
| 2011/0247421 A1 | * | 10/2011 | Tokuda et al. ........... 73/716 |

FOREIGN PATENT DOCUMENTS

| | | |
|---|---|---|
| CN | 1055060 A | 10/1991 |
| CN | 1651886 A | 8/2005 |
| JP | 5-72069 A | 3/1993 |
| JP | H8-128911 A | 5/1996 |
| JP | 9-304206 A | 11/1997 |
| JP | 1052538 C | 5/2000 |
| JP | 2002-277337 A | 9/2002 |

OTHER PUBLICATIONS

Korean Office Action dated Sep. 14, 2012, which issued during the prosecution of Korean Patent Application No. 10-2011-0032786.
Chinese Office Action dated Mar. 5, 2013, which issued during the prosecution of Chinese Patent Application No. 201110097553.X, which corresponds to the present application.

* cited by examiner

*Primary Examiner* — Andre Allen
(74) *Attorney, Agent, or Firm* — Troutman Sanders LLP (57) ABSTRACT

A pressure sensor including a sensor chip; a differential pressure diaphragm provided in the center portion of the sensor chip; a first differential pressure gauge formed along a radial direction relative to the center of the differential pressure diaphragm, provided on a first edge of the differential pressure diaphragm; a second differential pressure gauge formed along a circumferential direction, which is perpendicular to the radial direction, provided in the vicinity of the first differential pressure gauge on the first edge of the differential pressure diaphragm; and a static pressure diaphragm disposed between an edge portion of the sensor chip and one of the edges, other than the first edge, of the differential pressure diaphragm, provided to the outside of the differential pressure diaphragm.

5 Claims, 8 Drawing Sheets

PRESSURE SENSOR

CROSS REFERENCE TO RELATED APPLICATIONS

The present application claims priority under 35 U.S.C. §119 to Japanese Patent Application No. 2010-092429, filed Apr. 13, 2010, which is incorporated herein by reference.

FIELD OF TECHNOLOGY

The present invention relates to a pressure sensor, and, more specifically, relates to a pressure sensor having a diaphragm.

BACKGROUND OF THE INVENTION

Pressure sensors that use a semiconductor piezoresistance effect are small and light, and have high sensitivity, and thus are used broadly in fields such as industrial instrumentation and medicine. In this type of pressure sensor, a diaphragm is formed on a semiconductor substrate. Strain gages are formed on the diaphragm. The strain gages are deformed by pressure applied to the diaphragm. The pressure is measured by detecting the changes in resistances in the strain gages due to the piezoresistance effect.

There are known one-chip pressure sensors provided with a differential pressure diaphragm and a static pressure diaphragm on the same substrate (Japanese Unexamined Patent Application Publication H5-72069 ("JP '069")). In this document, a strain isolating band is formed between a differential pressure strain gauge and a static pressure strain gauge. The formation of the strain isolating band prevents the stress that is produced in the static pressure diaphragm when a static pressure is applied from propagating to the differential pressure diaphragm, thereby preventing the differential pressure value from being influenced by the applied pressure. For example, when a differential pressure is applied, excess stress is produced in the sensor chip due to the deformation of the differential pressure diaphragm. The static pressure gauge is affected by this stress. Additionally, when a static pressure is applied, excess stress is produced in the sensor chip due to the deformation of the static pressure diaphragm. The differential pressure gauge is affected by this stress. These effects are reduced by the strain isolating band.

A pressure sensor of another structure has also been disclosed (Japanese Patent 3359493 ("JP '493")). In this pressure sensor, a structure is used wherein appropriate non-bonded regions are provided at corner portions of a bonding surface between a sensor chip and a pedestal. Specifically, a differential pressure diaphragm is formed in the center of the sensor chip, and non-bonded regions are formed at the corner portions of the sensor chip. This makes it possible to reduce the zero shift due to temperature, and reduce the variability thereof, to produce excellent thermal characteristics.

However, JP '069, when the sensor chip is miniaturized it becomes difficult to secure adequate space for the strain isolating band. That is to say, the sensor chip is larger by the size of the strain isolating band. Additionally, when the structure in JP '493 is applied to a one-chip pressure sensor, it becomes difficult to secure space for the formation of the non-bonded regions at the corner portions of the sensor chip.

In this way, there is a problem in that it is difficult to achieve a small high-performance pressure sensor.

The present invention was created in order to solve this type of problem area, and the object thereof is to provide a small high-performance pressure sensor.

SUMMARY OF THE INVENTION

A pressure sensor according to present invention includes a substrate; a differential pressure diaphragm provided in the center portion of the substrate; a first differential pressure gauge formed along a radial direction relative to the center of the differential pressure diaphragm, provided on a first edge of the differential pressure diaphragm; a second differential pressure gauge formed along a circumferential direction, which is perpendicular to the radial direction, provided in the vicinity of the first differential pressure gauge on the first edge of the differential pressure diaphragm; and a static pressure diaphragm disposed between an edge portion of the substrate and one of the edges, other than the first edge, of the differential pressure diaphragm, provided to the outside of the differential pressure diaphragm.

When this structure is used, the two differential pressure gauges are disposed on one edge (the first edge) of the differential pressure diaphragm, and the static pressure diaphragm is formed to the outside of the edge of the differential pressure diaphragm wherein the differential pressure gauges are not formed (a different edge that is not the first edge). Because of this, when compared to a structure wherein differential pressure gauges are arranged at each of the edges of the differential pressure diaphragm, this enables there to be a longer distance between the differential pressure gauges and the static pressure diaphragm, thereby enabling a reduction in the influence of the differential pressure gauges when a static pressure is applied. Additionally, when compared to a structure wherein four static pressure diaphragms are provided towards the outside of the differential pressure diaphragm, it is possible to increase the distance between the static pressure diaphragm and the differential pressure diaphragm when using a substrate of the same size, and thus possible to reduce the influence on the static pressure gauge when a differential pressure is applied, and the influence of the differential pressure gauge when a static pressure is applied. In addition, conversely, if the distance between the static pressure diaphragms and the differential pressure diaphragm is kept the same, then the substrate can be made smaller. The result is the ability to obtain a small high-performance pressure sensor wherein it is possible to suppress crosstalk due to the interference between the static pressure and the differential pressure.

In the pressure sensor according to the present invention, a pedestal that is bonded to the substrate may also be provided, and a non-bonded region between the pedestal and the substrate may be formed from the first edge of the differential pressure diaphragm to an edge portion of the substrate.

When this structure is used, the static pressure diaphragms are not arranged in the peripheral edges of the non-bonded region, making it possible to secure space for forming the non-bonded region. Furthermore, adjusting the dimensions of the non-bonded region and the bonded region makes it possible to reduce the thermal zero shift and variability, making it possible to achieve excellent thermal properties. Consequently, the present invention is able to provide a small pressure sensor with higher performance.

Moreover, in the pressure sensor according to the present invention, a static pressure diaphragm that is shaped with its edge that is disposed along the radial direction being shorter than its edge that is disposed along the circumferential direction can be used. In such case, preferably static pressure gauges are disposed at both the center portion and an edge portion, arranged in the circumferential direction, of the static pressure diaphragm.

When this structure is used, one static pressure gauge is formed at an edge portion of a static pressure diaphragm, and another static pressure gauge is formed in the center portion of the static pressure diaphragm, and thus the change in resistance that is caused by a stress that is produced when there is a change in temperature will be in the same direction for both of the two static pressure gauges, making it possible to suppress the variability in the output due to changes in temperature.

Additionally, in the pressure sensor according to the present invention, the static pressure diaphragm can be formed in a rectangular shape.

The use of the structure makes it possible to manufacture the pressure sensor easily.

Additionally, in the pressure sensor according to the present invention, the static pressure diaphragm can also be formed in a square shape. In this case, it is possible to provide static pressure gauges in the respective array directions along two adjacent edges of the static pressure diaphragm.

The use of this structure enables an improvement in the thermal characteristics.

The present invention is able to provide a small high-performance pressure sensor.

DETAILED DESCRIPTION OF THE INVENTION

In the below, examples are explained in detail while referencing the drawings.

Figure 1:
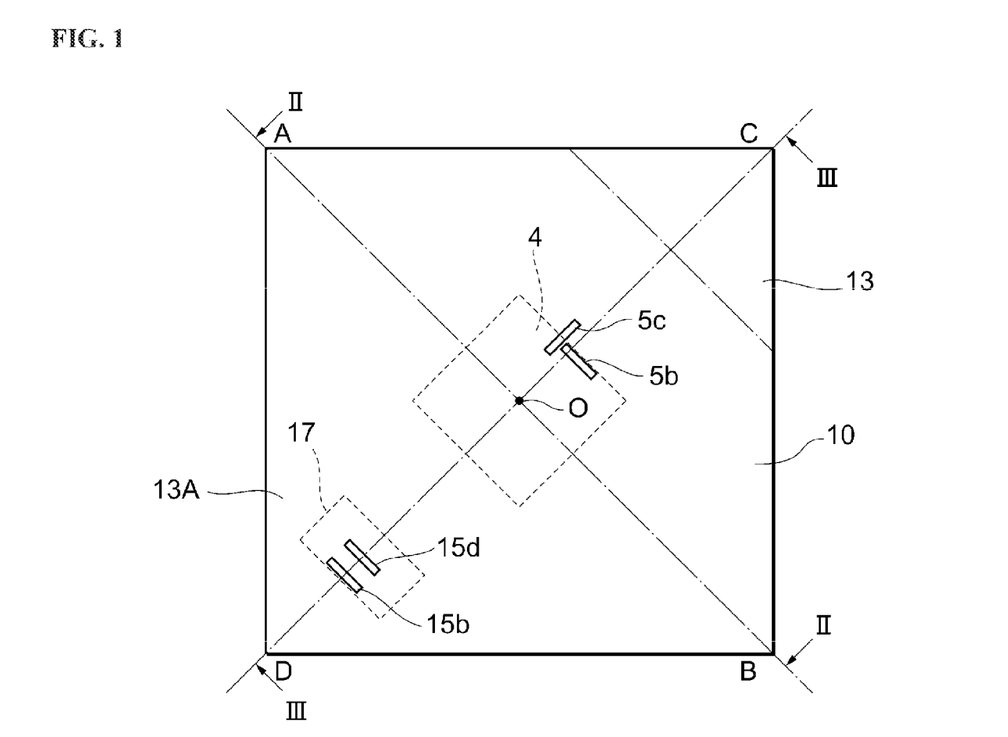
FIG. 1 is a top view illustrating the structure of a pressure sensor according to an example according to the present invention.
Figure 2:
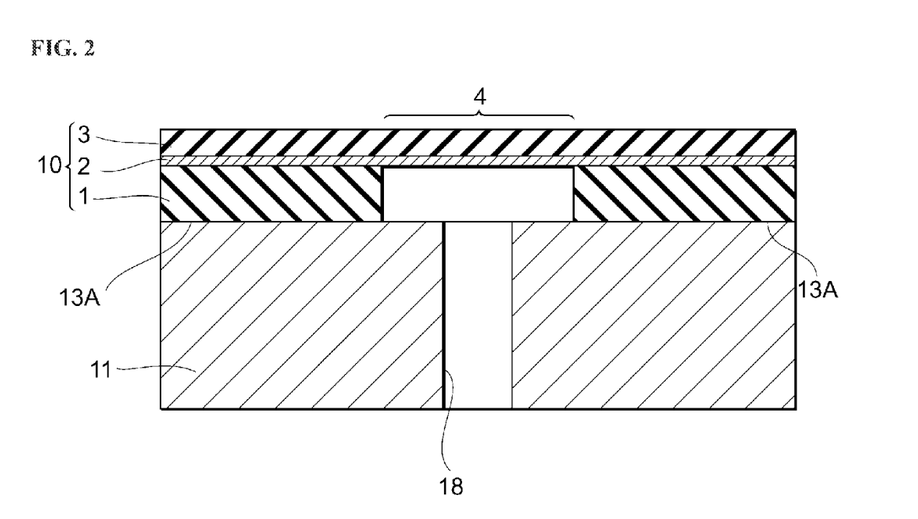
FIG. 2 is a cross-sectional diagram along the section II-II in FIG. 1.
Figure 3:
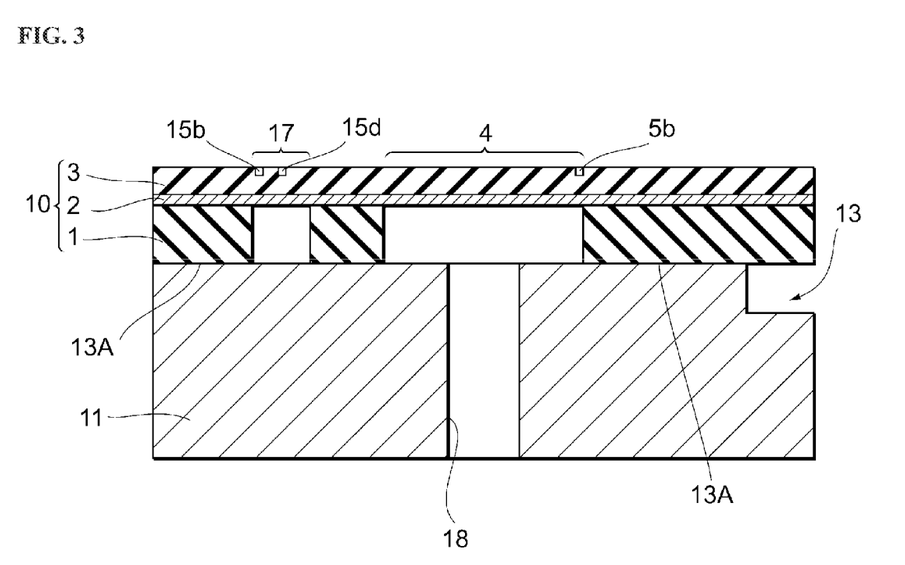
FIG. 3 is a cross-sectional diagram along the section III-III in FIG. 1.

A pressure sensor as set forth in an example according to the present invention will be explained first. FIG. 1 is a top view illustrating the structure of a sensor chip used in a pressure sensor according to the present example. FIG. 2 is a cross-sectional diagram along the section II-II in FIG. 1, and FIG. 3 is a cross-sectional diagram along the section III-III. The pressure sensor is a semiconductor sensor that uses the piezoresistance effect of semiconductors.

The pressure sensor has a sensor chip 10 that is made out of a semiconductor substrate. The sensor chip 10 is a square shape. As illustrated in FIG. 1, the corners of the square sensor chip 10 are defined as A, B, C, and D. As illustrated in FIG. 1, the upper-left corner is defined as corner A, the lower-right corner is defined as corner B, the upper-right corner is defined as corner C, and the lower-left corner is defined as corner D. The diagonal line connecting corner A and corner B is defined as the diagonal line AB, and the diagonal line connecting corner C and corner D is defined as the diagonal line CD. The sensor chip 10 is a square, and thus the diagonal line AB and the diagonal line CD bisect each other at right angles. In addition, the center of the sensor chip 10 is defined as the center O. The center O is coincident with the point of intersection between the diagonal line AB and the diagonal line CD.

As illustrated in FIG. 2, the sensor chip 10 has a three-layer structure with a first semiconductor layer 1, which is a base, an insulating layer 2, and a second semiconductor layer 3. For example, an SOI (Silicon On Insulator) substrate, comprising a first semiconductor layer 1, an insulating layer 2 with a thickness of about 0.5 μm, and a second semiconductor layer 3, may be used as the sensor chip 10. The first semiconductor layer 1 and the second semiconductor layer 3 may be structured from, for example, n-type single crystal silicon layers. The insulating layer 2 may be structured from, for example, an $SiO_2$ layer. The insulating layer 2 is formed on top of the first semiconductor layer 1.

Additionally, the second semiconductor layer 3 is formed on top of the insulating layer 2. Consequently, the insulating layer 2 is disposed between the first semiconductor layer 1 and the second semiconductor layer 3. The insulating layer 2 functions as an etching stopper when etching the first semiconductor layer 1. The second semiconductor layer 3 structures a differential pressure diaphragm 4. As illustrated in FIG. 2, the differential pressure diaphragm 4 is disposed in the center part of the chip.

The differential pressure diaphragm 4, for detecting a differential pressure, is disposed in the center part of the sensor chip 10. As illustrated in FIG. 2, the differential pressure diaphragm 4 is formed by removing the first semiconductor layer 1. That is, the sensor chip 10 is thinned at the differential pressure diaphragm 4. As illustrated in FIG. 1, here the differential pressure diaphragm 4 is formed in the shape of a square. Additionally, the center of the differential pressure diaphragm 4 is coincident with the center O of the sensor chip 10. That is, the center point of the differential pressure diaphragm 4 is on the point of intersection between the diagonal line AB and the diagonal line CD. Additionally, the differential pressure diaphragm 4 is disposed angled at 45° relative to the square sensor chip 10. Consequently, the diagonal line AB passes perpendicularly through the center of two opposing edges of the differential pressure diaphragm 4. Additionally, the diagonal line CD passes perpendicularly through the centers of the other two opposing edges of the differential pressure diaphragm 4.

Differential pressure gauges 5b and 5c are disposed on the surface of the differential pressure diaphragm 4. These two differential pressure gauges 5b and 5c are referred to, in aggregate, as the differential pressure gauges 5. The differential pressure gauges 5 are disposed at the edge portions of the differential pressure diaphragm 4. That is, the differential pressure gauges 5 are formed on the circumferential edge portions of the differential pressure diaphragm 4.

Two differential pressure gauges are formed on one edge (the first edge) that is parallel with the diagonal line AB of the differential pressure diaphragm 4. That is, the differential pressure gauges 5 are formed on only one edge of the differential pressure diaphragm 4, and no differential pressure gauges are formed on the other three edges. Here differential pressure gauges 5b and 5c are formed on the edge on the corner C side. In this way, the two differential pressure gauges 5 are formed on one edge of the differential pressure diaphragm 4, where one differential pressure gauge 5c is formed near the other differential pressure gauge 5b.

The long direction of the differential pressure gauge 5b is perpendicular to the diagonal line CD. That is, the differential pressure gauge 5b is formed so as to be parallel to one edge of the differential pressure diaphragm 4 wherein the differential pressure gauge 5b is formed. On the other hand, the long direction of the differential pressure gauge 5c is parallel to the diagonal line CD. That is, the differential pressure gauge 5c is formed so as to be perpendicular to one edge of the differential pressure diaphragm 4 wherein the differential pressure gauge 5c is formed. Consequently, the differential pressure gauge 5b and the differential pressure gauge 5c that are disposed near to each other are provided in mutually perpendicular directions.

The differential pressure gauges 5 are strain gauges having the piezoresistance effect. Consequently, when the sensor chip 10 deforms, the resistances of each of the differential pressure gauges 5b and 5c will change. Note that, on the top surface of the sensor chip, interconnections (not shown) are formed connecting the individual differential pressure gauges 5b and 5c. For example, interconnections are connected to both ends of each of the differential pressure gauges 5b and 5c. The two differential pressure gauges 5 are connected in a bridge circuit by these interconnections. The differential pressure diaphragm 4 deforms due to a pressure differential between the spaces partitioned by the differential pressure diaphragm 4. In the differential pressure gauges 5, the resistances vary in accordance with the amount of deformation of the differential pressure diaphragm 4. The pressure can be measured by detecting these variations in the resistances. The differential pressure gauges 5 are formed on the surface of the sensor chip 10 as illustrated in FIG. 3. Additionally, interconnections (not shown) are connected to both ends of the differential pressure gauges 5b and 5c in the lengthwise direction. For example, the differential pressure gauge 5b is formed in the parallel to the <110> crystal axial direction wherein the piezoresistance factor is maximized in the (100) crystal face orientation of the sensor chip 10.

Moreover, a single static pressure diaphragm 17 is provided in the sensor chip 10. As illustrated in FIG. 3, the static pressure diaphragm 17 is formed by removing the first semiconductor layer 1. That is, the sensor chip 10 is thinned at the static pressure diaphragm 17. The static pressure diaphragm 17 is disposed to the outer portion of the differential pressure diaphragm 4. That is, the static pressure diaphragm 17 is disposed to the outside of the differential pressure diaphragm 4. The static pressure diaphragm 17 is disposed on the diagonal line CD. The static pressure diaphragm 17 is smaller than the differential pressure diaphragm 4.

The static pressure diaphragm 17 is disposed between the center O and the corner D. That is, the static pressure diaphragm 17 is disposed between one edge of the corner D side of the differential pressure diaphragm 4 and the corner D. Here the one edge on the corner D side of the differential pressure diaphragm 4 is an edge wherein the differential pressure gauges 5 are not formed.

The static pressure diaphragms 17 is formed in a rectangular shape. Consequently, the long edge and the short edge of the static pressure diaphragm 17 are perpendicular to each other. That is, the static pressure diaphragm 17 has a long direction and a short direction. Here let us define the direction extending towards an outer edge from the center of the sensor chip 10 as the radial direction (the r direction). That is, the direction towards the edge of the sensor chip 10 from the center point of the sensor chip 10 is the radial direction. Because the center points of the sensor chip 10 and the differential pressure diaphragm 4 are coincident, the radial direction is the radial direction with respect to the center of the differential pressure diaphragm 4. Let us define the direction perpendicular to the radial direction as the circumferential direction (the θ direction). The circumferential direction corresponds to the direction of the tangent of the circle centered on the center of the sensor chip 10. The short edge of the static pressure diaphragm 17 is parallel to the radial direction.

The short edge of the static pressure diaphragm 17 is parallel to the diagonal line CD. Moreover, the long direction of the static pressure diaphragm 17 and the circumferential direction are parallel on the diagonal line CD. The static pressure gauges 15h and 15d are formed in the static pressure diaphragm 17. The static pressure gauge 15b is formed on the edge portion of the static pressure diaphragm 17. The static pressure gauge 15h is formed on the edge of the corner D side of the static pressure diaphragm 17, formed with a long edge thereof along the long edge of the static pressure diaphragm 17. On the other hand, the static pressure gauge 15d is formed in the center portion of the static pressure diaphragm 17. That is, the static pressure gauge 15d is formed towards the inside from the circumferential edge of the static pressure diaphragm 17.

The static pressure gauges 15b and 15d are strain gauges, in the same manner as the differential pressure gauges 5. Consequently, when the sensor chip 10 deforms, the resistances of each of the static pressure gauges 15b and 15d will change due to the piezoresistance effect. The static pressure gauges 15b and 15d are connected to a bridge circuit, in the same manner as the differential pressure gauges 5. Doing so makes it possible to measure the static pressure. Note that the static pressure gauges 15b and 15d are formed on the surface of the sensor chip 10 as illustrated in FIG. 3. Additionally, interconnections (not shown) are connected to both ends of the static pressure gauges 15b and 15d in the lengthwise direction. Furthermore, the static pressure gauges 15b and 15d are connected to a bridge circuit, in the same manner as the differential pressure gauges 5.

Here the static pressure diaphragm 17 is formed to the outside of the edge of the differential pressure diaphragm 4 wherein no differential pressure gauge 5 is formed. That is, because the differential pressure gauges 5 are formed on the edge on the corner C side in the differential pressure diaphragm 4, the static pressure diaphragm 17 is not formed between the corner C and the differential pressure diaphragm 4. The static pressure diaphragm 17 is disposed between an edge of the differential pressure diaphragm 4 (the edge on the corner 1) side) that is not the one edge (the edge on the corner C side) of the differential pressure diaphragm 4 wherein the differential pressure gauges 5 are formed.

The effect on the differential pressure gauges 5 when a static pressure is applied is reduced thereby. A greater distance can be achieved between the differential pressure gauges 5 and the static pressure diaphragm 17 than in the structure wherein the differential pressure gauges 5 are arranged on each of the edges of the differential pressure diaphragm 4. Consequently, this enables the differential pressure to be measured more accurately. Moreover, a greater distance can be achieved between the static pressure gauges 15 and the differential pressure diaphragm 4 than in the structure wherein the static pressure diaphragms 17 are structured provided in the four outer peripheral portions of the differential pressure diaphragm 4. This enables a reduction in the effect on the static pressure gauges 15b and 15d when a differential pressure is applied. Thus this enables the static pressure to be measured more accurately. As a result, it is possible to measure both the static pressure and the differential pressure more accurately. The space between the differential pressure diaphragm 4 and the static pressure gauges 15*b* and 15*d* can be increased. Because of this, it is possible to reduce the effect of the stress that is produced by the neighboring diaphragm. That is, it is possible to suppress the effects of crosstalk that is produced through interference between static pressure and differential pressure.

The radial direction differential pressure gauge 5*c*, which corresponds to the first differential pressure gauge in the present invention, and the circumferential direction differential pressure gauge 5*b*, which corresponds to the second differential pressure gauge in the present invention, are formed on one edge of the differential pressure diaphragm 4. That is, two differential pressure gauges 5*b* and 5*c*, which are formed in mutually perpendicular directions, are formed on the same edge of the differential pressure diaphragm 4. Furthermore, a bridge circuit is formed from the two differential pressure gauges 5*b* and 5*c* that are disposed on the one edge (and two external fixed resistances, not illustrated). Moreover, the static pressure diaphragm 17 is disposed in the direction wherein the differential pressure gauges 5 are not provided. That is, the static pressure diaphragm 17 is formed to the outside of the edge wherein the differential pressure gauges 5 are not provided. This structure enables the accurate measurement of both the static pressure and the differential pressure. That is, this can achieve a small high-performance pressure sensor. Note that while in the present invention the differential pressure gauges 5*b* and 5*c* were formed on an edge of the differential pressure diaphragm 4, they may instead be formed in a location wherein the maximum stress is produced near the edge portion of the differential pressure diaphragm.

Additionally, the sensor chip 10 is bonded to the pedestal 11. The region wherein the pedestal 11 and the sensor chip 10 are bonded is defined as the bonded region 13A. Moreover, the region wherein the pedestal 11 and the sensor chip 10 are not bonded is defined as the non-bonded region 13. That is, as illustrated in FIG. 3, a thin portion is formed at an edge portion on the corner C side of the pedestal 11, and a thick portion is formed elsewhere, in the thin portion, the height is lower than in the thick portion. This thick portion bonded to the sensor chip 10. On the other hand, in the thin portion the pedestal 11 is not bonded to the sensor chip 10.

Here the non-bonded region 13 is formed on the corner C side. Additionally, the non-bonded region 13 has a triangular shape. That is, the non-bonded region 13 forms a right isosceles triangle having the vertex thereof being the corner C. The region other than the non-bonded region 13 is the bonded region 13A, where a through hole 18 is formed in the center of the bonded region 13A. The through hole 18 that is provided in the pedestal 11 connects to the differential pressure diaphragm 4. This causes the through hole 18 to be a guide port, enabling the air to be guided to the differential pressure diaphragm 4. The boundary line between the bonded region 13A and the non-bonded region 13 is parallel to the diagonal line AB. In this way, the direction in which the non-bonded region 13 is provided is different from the direction in which the static pressure diaphragm 17 is provided. That is, the non-bonded region 13 is provided in the region between the center O and the corner C, and the static pressure diaphragm 17 is provided in the region between the center O and the corner D.

The dimensions of the non-bonded region 13 and of the bonded region 13A are adjusted so that the stresses that are produced in the direction of the diagonal line AB and the stresses that are produced in the direction of the diagonal line CD, which is perpendicular thereto, will be identical. This type of structure makes it possible to improve the thermal characteristics. That is, as disclosed in Japanese Patent 3359493, this makes it possible to reduce the zero shift and variability due to temperature, to produce excellent thermal characteristics. Moreover, this enables a structure wherein the static pressure diaphragm 17 is not disposed on the peripheral edge of the non-bonded region 13. Consequently, this makes it possible to secure a space for forming the non-bonded region 13. A small high-performance pressure sensor can be achieved thereby.

Figure 4:
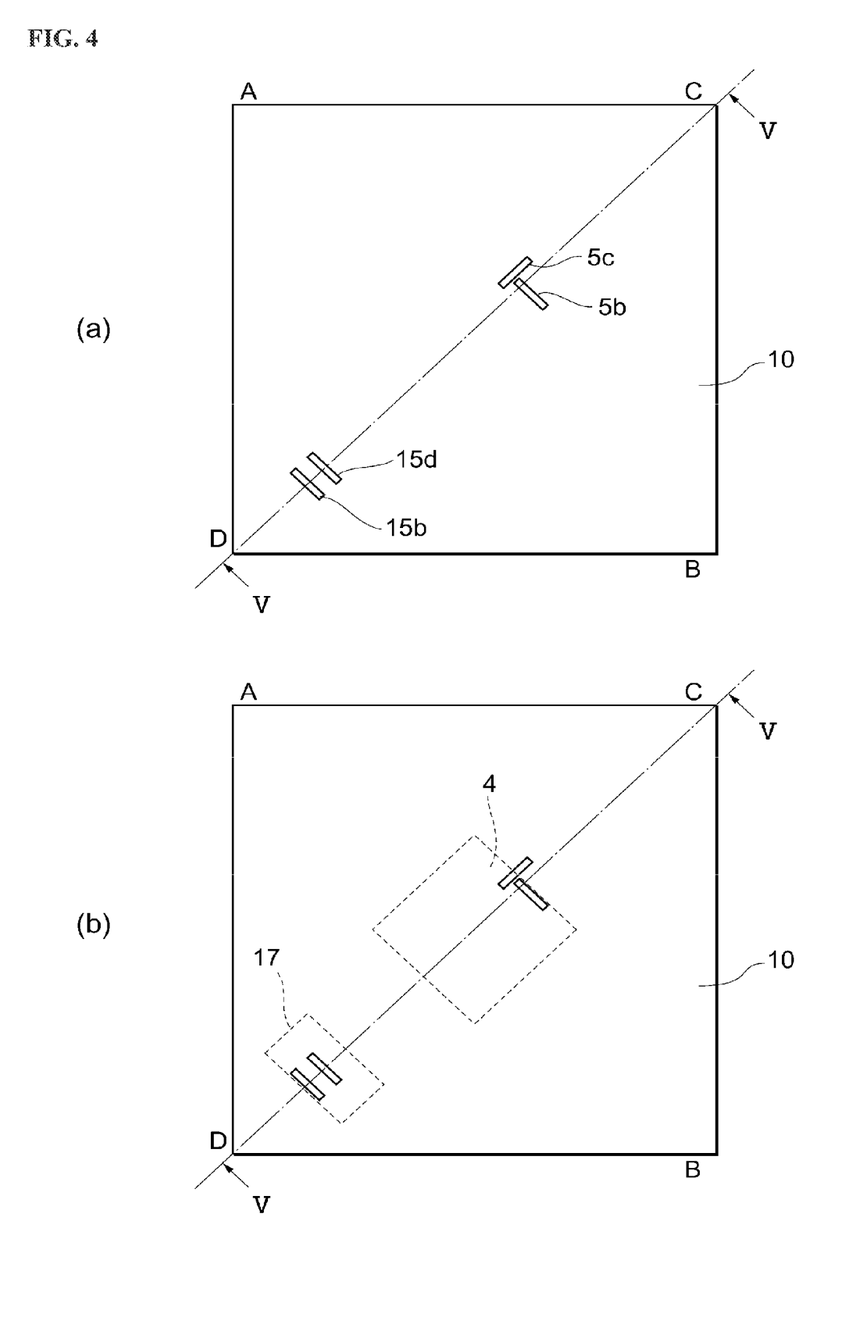
FIG. 4 is a diagram illustrating a manufacturing process for a sensor chip for the pressure sensor.
Figure 5:
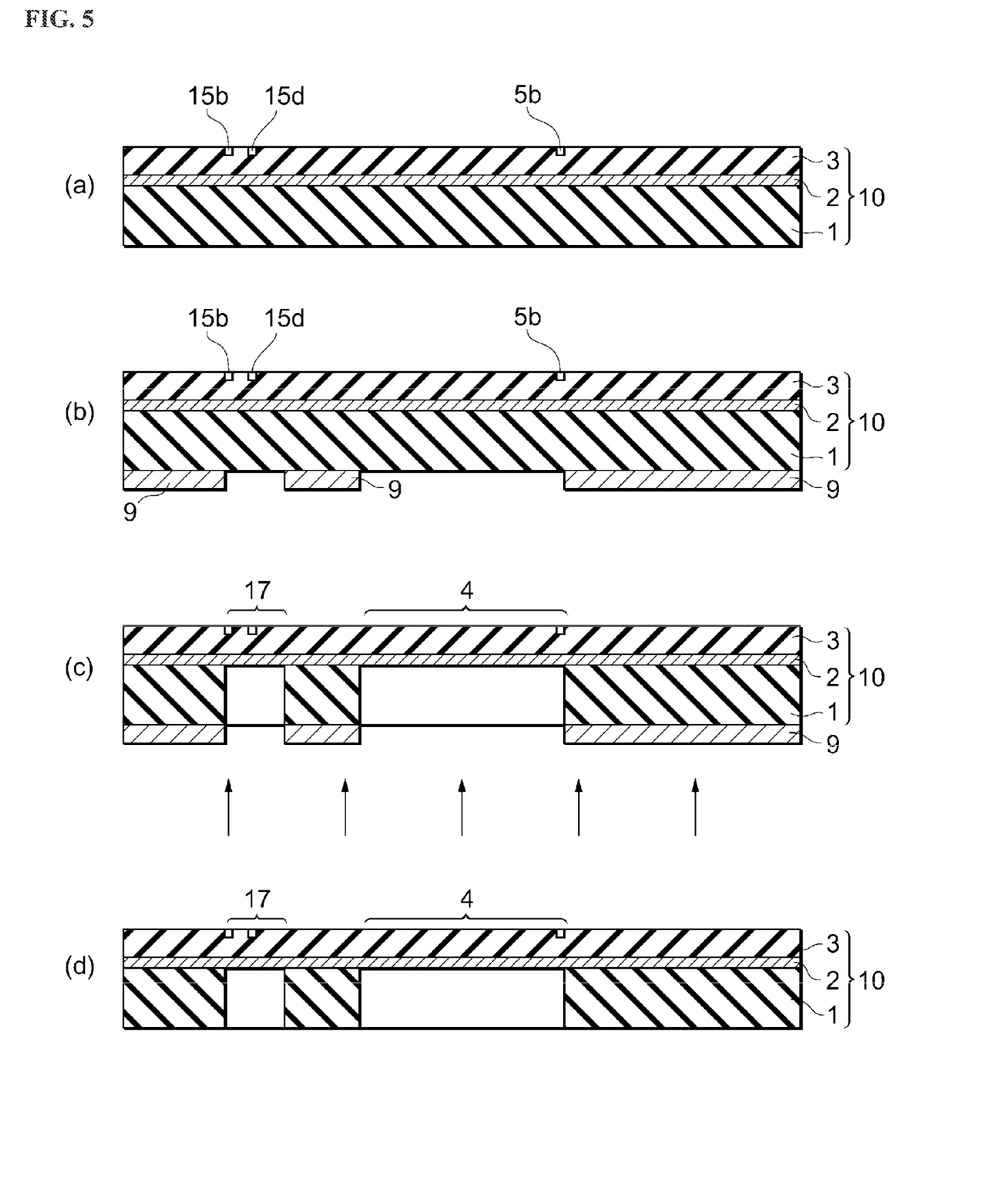
FIG. 5 is a diagram illustrating a manufacturing process for a sensor chip for the pressure sensor, a cross-sectional diagram along the section V-V of FIG. 4.

A method for manufacturing the pressure sensor according to an example is explained next. The method for manufacturing the sensor chip 10 that is used in the pressure sensor is explained first using FIG. 4 and FIG. 5. FIG. 4 is a diagram illustrating a method for manufacturing the sensor chip 10, and shows the structure when the sensor chip 10 is viewed from above. FIG. 5 is a diagram illustrating a method for manufacturing the sensor chip 10, and shows the structure along section V-V in FIG. 4.

First, an SOI (Silicon On Insulator) wafer, comprising a first semiconductor layer 1, an insulating layer 2 with a thickness of about 0.5 µm, and a second semiconductor layer 3, is prepared. In manufacturing this SOI wafer, the SIMOX (Separation by IMplanted OXygen) technology wherein an $SiO_2$ layer is formed through implanting oxygen into a silicon substrate, may be used, the SDB (Silicon Direct Bonding) technology wherein two selecting substrates are bonded together, may be used, or another method may be used. Note that the second semiconductor layer 3 may be planarized and thinned. For example, the second semiconductor layer 3 may be polished to a specific thickness using a polishing method known as CCP (Computer-Controlled Polishing).

The static pressure gauges 15*b* and 15*d* are formed from p-type silicon, through an impurity diffusing method or an ion implantation method, on the top surface of the second semiconductor layer 3. Doing so forms the structure illustrated in FIG. 4 (*a*) and FIG. 5 (*a*). Of course, the differential pressure gauges 5*b* and 5*c* can also be formed in this step. As illustrated in FIG. 1, and the like, each gauge is formed in a specific position of the location that will form each diaphragm. Note that the differential pressure gauges 5*b* and 5*c* and the static pressure gauges 15*b* and 15*d* may instead be formed after the diaphragm forming process set forth below. Of course, the differential pressure gauges 5 and the static pressure gauges 15*b* and 15*d* may be given mutually differing characteristics.

A resist 9 is formed on the bottom surface of the SOI wafer that is fabricated in this way. The pattern of the resist 9 is formed on the first semiconductor layer 1 through a well-known photolithography process. That is, a photosensitive resin layer is coated, exposed, and developed to form a pattern in the resist 9. The resist 9 has opening portions at parts that correspond to the pressure sensitive regions (the regions wherein the diaphragms will be formed). That is, the first semiconductor layer 1 is exposed in the parts wherein the diaphragms will be formed. Doing so forms the structure illustrated in FIG. 5 (*b*).

The first semiconductor layer 1 is etched using the resist 9 as a mask. Doing so forms the structure illustrated in FIG. 5 (*c*). Dry etching, for example, the well-known ICP etching, or the like, may be used to etch the first semiconductor layer 1. Of course, the first semiconductor layer 1 may instead be etched using a wet etching method that uses a solution such as KOH or TMAH. The differential pressure diaphragm 4 and the static pressure diaphragm 17 are formed when the first semiconductor layer is etched. Here the insulating layer 2 functions as an etching stopper. Consequently, the insulating layer 2 is exposed in the opening portions of the resist 9.

The structure illustrated in FIG. 4 (*a*) and FIG. 5 (*d*) is then formed when the resist 9 is removed. Thereafter, the interconnections (not shown) for achieving electrical connections between the static pressure gauges 15*b* and 15*d* and the differential pressure gauges 5 are formed. Doing so forms a bridge circuit, completing the sensor chip 10. Note that the process for forming the interconnections may be performed instead prior to FIG. 5 (d). For example, the interconnections may be formed prior to FIG. 5 (a), or may be formed between FIG. 5 (a) and FIG. 5 (c). Additionally, as described above, the formation of the static pressure gauges 15b and 15d and the differential pressure gauges 5 may be performed after FIG. 5 (d), or may be performed between FIG. 5 (a) and FIG. 5 (d). That is, there is no particular limitation to the sequence of the interconnection forming process and the strain gauge forming process.

Furthermore, the differential pressure diaphragm 4 and the static pressure diaphragm 17 may be formed in separate etching steps. For example, two different resist patterns may be used, to perform the etching of the differential pressure diaphragm 4 and of the static pressure diaphragm 17 separately. That is, etching is performed after forming the resist pattern for providing the differential pressure diaphragm 4. The resist is removed after forming the differential pressure diaphragm 4. Following this, the resist pattern for providing the static pressure diaphragm 17 is formed. The static pressure diaphragm 17 is formed when etching is performed using this resist pattern as a mask. The provision of the differential pressure diaphragm 4 and the static pressure diaphragm 17 in separate etching steps in this way makes it possible to have the differential pressure diaphragm 4 and the static pressure diaphragm 17 have different thicknesses. Of course, the differential pressure diaphragm 4 may be formed after forming the static pressure diaphragm 17.

Figure 6:
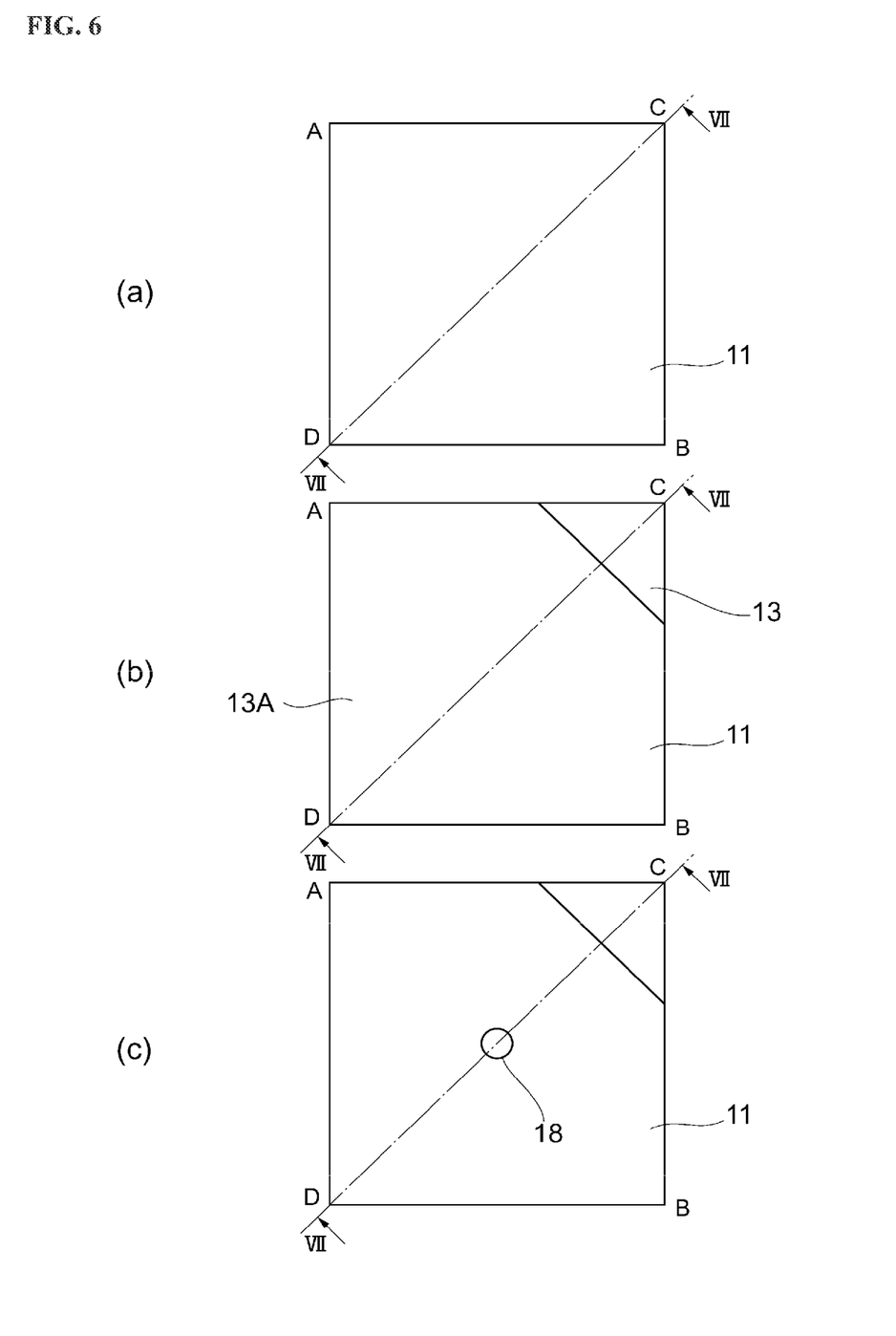
FIG. 6 is a diagram illustrating a manufacturing process for the pedestal for the pressure sensor.
Figure 7:
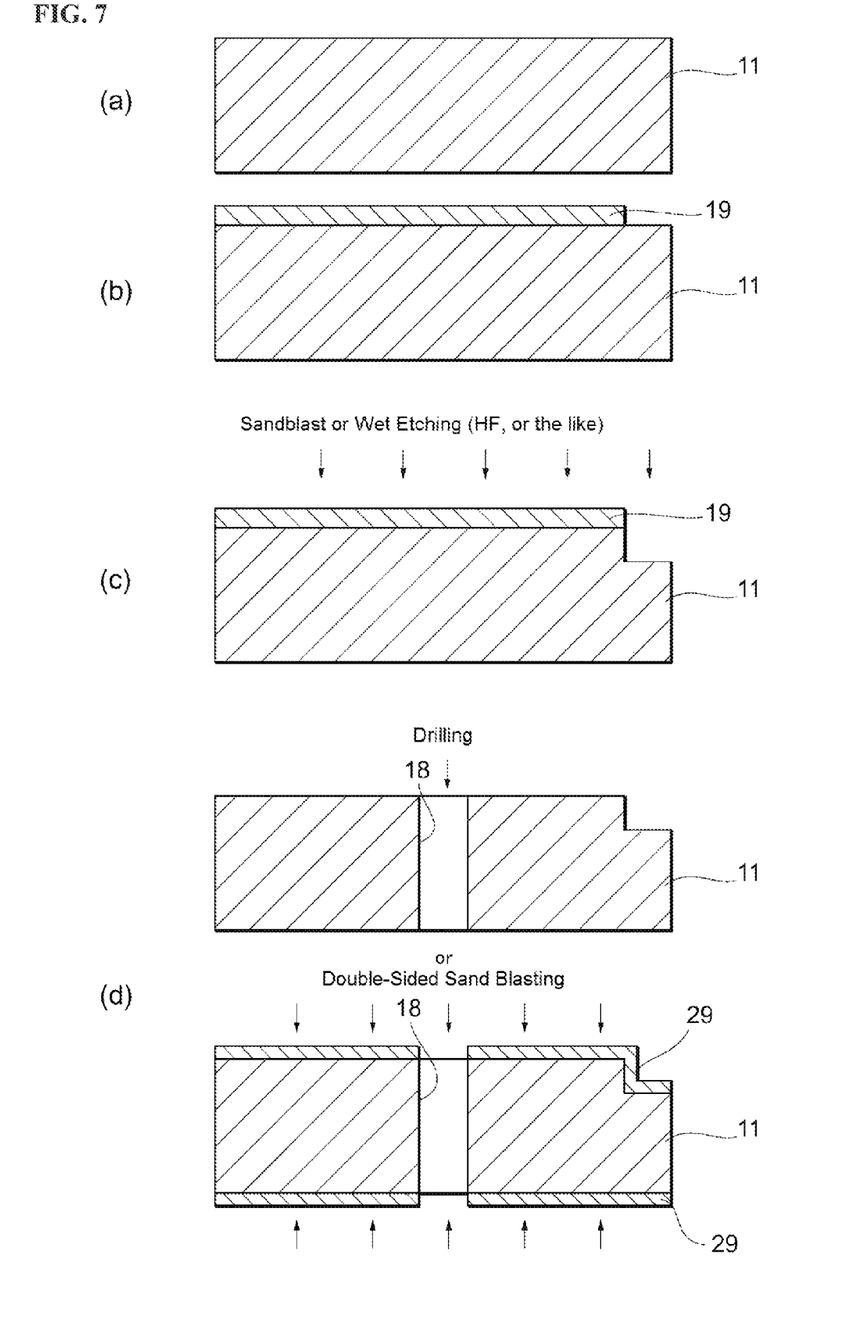
FIG. 7 is a diagram illustrating a manufacturing process for a pedestal for the pressure sensor, a cross-sectional diagram along the section VII-VII of FIG. 6.

The method for manufacturing the pedestal 11 will be explained next using FIG. 6 and FIG. 7. FIG. 6 is a diagram illustrating a method for manufacturing the pedestal 11, and shows the structure when the pedestal 11 is viewed from above. FIG. 7 is a diagram illustrating a method for manufacturing the pedestal 11, and shows the structure along section VII-VII in FIG. 6.

First, as illustrated in FIG. 6 (a) and FIG. 7, a substrate that will become the pedestal 11 is prepared. A flat substrate of for example, Pyrex® glass or ceramic, or the like, is used for the substrate. Resist 19 is then formed, to be a mask, on the pedestal 11. Doing so forms the structure illustrated in FIG. 7 (b). The resist 19 is patterned through well-known exposure and develop processes. The resist 19 is removed in the portion that will become the non-bonded region 13. That is, the portion that will become the non-bonded region 13 is exposed from the pedestal 11, and the pedestal 11 is covered by the resist 19 in the portion that will become the bonded region 13A.

The structure illustrated in FIG. 6 (a) and FIG. 7 (c) is then formed when etching is performed using the resist 19 as a mask. A recessed portion is formed at the edge portion corresponding to the corner C of the pedestal 11, and the remaining portion is left as a raised portion. That is, the pedestal 11 is thinned locally, forming a thick portion and a thin portion in the pedestal 11. The thin portion is thinner than the thick portion. The thin portion is formed into the non-bonded region 13. Here the thin portion is formed in the pedestal 11 through wet etching using HF, or the like. Conversely, the thin portion may be formed through sand blasting, or the like.

After this, the resist 19 is removed and the through hole 18 is formed. That is, a circular through hole 18 is formed in the center of the pedestal H. Doing so forms the structure illustrated in FIG. 6 (c). The through hole 18, as illustrated at the top in FIG. 7 (d), for example, can be formed through a drilling process. Conversely, as shown on the bottom in FIG. 7 (d), it may be formed instead through a sandblasting process from both sides. Note a mask 29 is formed on both sides of the pedestal 11 if formation is to be through a double-sided sandblasting process. The pedestal 11 is completed in this way.

Following this, the sensor chip 10 is bonded to the pedestal 11. The pedestal 11 may be bonded to the first semiconductor layer 1 of the sensor chip 10 using anode bonding, for example. The through hole 18 that arrives at the differential pressure diaphragm 4 is formed in the center of the pedestal 11. The through hole 18 penetrates to the differential pressure diaphragm 4. Additionally, the non-bonded region 13 is formed at the peripheral edge at the corner C. The manufacturing of the pressure sensor is completed in this way. The pressure sensor fabricated in this way is small and has high performance.

Note that while in the explanation above the shape of the sensor chip 10 and of the differential pressure diaphragm 4 were squares inclined at a 45° angle, the shapes are not limited to being squares. For example, the shapes of the sensor chip 10 and the differential pressure diaphragm 4 may be polygons instead. The differential pressure gauges 5b and 5c are arranged on one edge of the differential pressure diaphragm 4, and the static pressure diaphragm 17 and the static pressure gauges 15b and 15d are arranged to the outside of one edge facing that one edge. This makes it possible to achieve easily a pressure sensor with excellent thermal properties and reduced crosstalk. Conversely, the sensor chip 10 and the differential pressure diaphragm 4 may be circular. Even in this case, the differential pressure gauge 5b is disposed in the vicinity of the differential pressure gauge 5c. Doing so makes it possible to achieve easily a pressure sensor with reduced crosstalk.

Moreover, while the examples above describe a rectangular static pressure diaphragm 17, the shape of the static pressure diaphragm 17 is not limited to being rectangular. For example, the static pressure diaphragm may be elliptical, or the like, instead. In other words, may be any shape having a long direction and a short direction. Additionally, it may be arranged with the short direction, which is perpendicular to the long direction, along the radial direction. The long directions of the static pressure gauges 15b and 15d are arranged along the long direction of the static pressure diaphragm 17. That is, the long directions of the pressure gauges 15b and 15d are arranged along the circumferential direction. Additionally, while these static pressure gauges 15b and 15d were formed at edge portions of the substrate edge side of the static pressure diaphragm 17, they may instead be formed at the edge portion on the substrate center side. Moreover while the static pressure gauges 15b and 15d were formed on an edge of the static pressure diaphragm 17, they may instead be formed in a location wherein the maximum stress is produced near the edge portion of the static pressure diaphragm.

Figure 8:
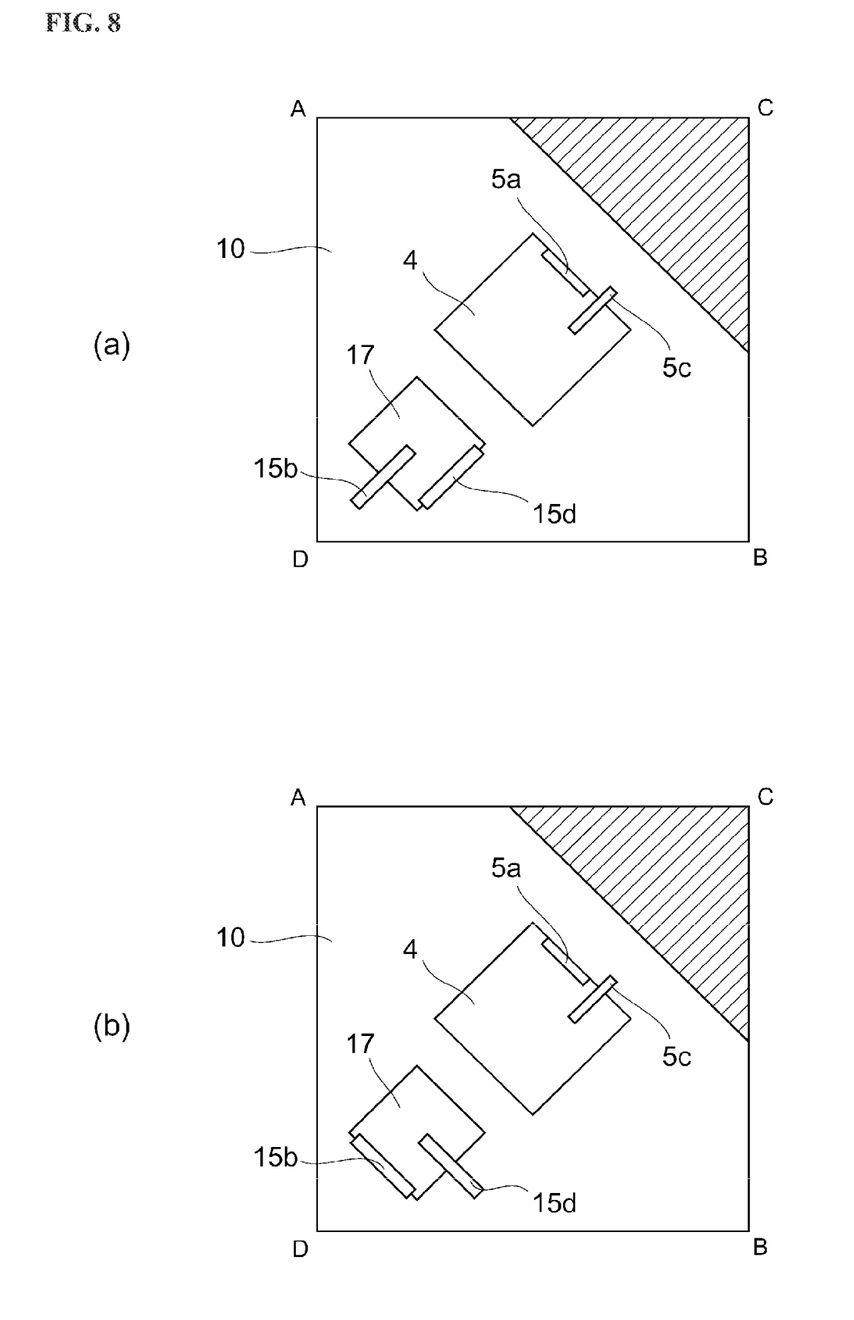
FIG. 8 is a top view illustrating the structure of a pressure sensor according to another example according to the present invention.

FIG. 8 is used to explain a pressure sensor as set forth in another example according to the present invention, FIG. 8 is a top view illustrating the structure of a sensor chip used in a pressure sensor. In the present example the arrangement of the static pressure gauges 15b and 15d differs from that in the above example. Moreover, the static pressure diaphragm 17 has a structure that is a square shape. The structures aside from these arrangements are identical to those in the above example, and thus explanations thereof will be omitted. Additionally, in FIG. 8 (a) and FIG. 8 (b), the static pressure gauges 15b and 15d have respectively different arrangements.

The structure of the sensor chip illustrated in FIG. 8 (a) will be explained first. A single square static pressure diaphragm 17 is formed. In FIG. 8 (a), two static pressure gauges 15b and 15d are parallel to the diagonal line CD. In the present form of embodiment, the two static pressure gauges 15b and 15d are formed in the edge portion of the static pressure diaphragm 17. Moreover, the static pressure gauges 15*b* and 15*d* are disposed at two adjacent edges of the static pressure diaphragm 17. The static pressure gauge 15*b* is disposed on an edge of the static pressure diaphragm 17 that is parallel to the diagonal line AB, and is perpendicular to the edge of the static pressure diaphragm 17 wherein it is disposed. On the other hand, the static pressure gauge 15*d* is disposed on an edge of the static pressure diaphragm 17 that is parallel to the diagonal line CD, and is parallel to the edge of the static pressure diaphragm 17 wherein it is disposed. The same effect as in the above example can be obtained in this structure as well.

The structure of the sensor chip illustrated in FIG. 8 (*b*) is explained next. The structure illustrated in FIG. 8 (*b*), relative to the structure in FIG. 8 (*a*), differs in the direction of the static pressure gauges 15*b* and 15*d*. The other structures are identical to those in the above example and illustrated in FIG. 8 (*a*), and thus explanations thereof will be omitted. As illustrated in FIG. 8 (*b*), static pressure gauges 15*b* and 15*d* are parallel to the diagonal line AB. Moreover, the two static pressure gauges 15*b* and 15*d* are disposed at an edge portion of the static pressure diaphragm 17, and the static pressure gauges 15*b* and 15*d* are disposed at two adjacent edges of the static pressure diaphragm 17. The static pressure gauge 15*b* is disposed on one edge of the static pressure diaphragm 17 at the corner D side, and is parallel to that edge. On the other hand, the static pressure gauge 15*d* is perpendicular to the edge of the static pressure diaphragm 17 wherein it is disposed. The same effect as in the above example can be Obtained in this structure as well.

In this way, in the present example, static pressure gauges are disposed respectively on two adjacent edges of the static pressure diaphragm 17. At one edge, the static pressure gauge is perpendicular to the edge, and at the other edge, the static pressure gauge is parallel to the edge. Of course, the structure may be other than those illustrated in FIG. 8 (*a*) through FIG. 8 (*c*).

The invention claimed is:

1. A pressure sensor comprising:
a substrate;
a differential pressure diaphragm, having at least a first edge, provided in a center portion of the substrate;
a single pair of first and second differential pressure gauges provided only on the first edge of the differential pressure diaphragm,
the first differential pressure gauge formed along a radial direction relative to a center of the differential pressure diaphragm, and
the second differential pressure gauge formed along a circumferential direction, which is perpendicular to the radial direction, and provided in a vicinity of the first differential pressure gauge on the first edge of the differential pressure diaphragm;
a static pressure diaphragm disposed between an edge portion of the substrate and one of the edges, other than the first edge, of the differential pressure diaphragm, provided to an outside of the differential pressure diaphragm.

2. The pressure sensor as set forth in claim 1, further comprising:
a pedestal bonded to the substrate; wherein:
a non-bonded region between the pedestal and the substrate is formed between the first edge of the differential pressure diaphragm and the edge portion of the substrate.

3. The pressure sensor as set forth in claim 2, wherein:
the static pressure diaphragm is shaped with a short edge that is disposed in the radial direction being shorter than an edge that is disposed in the circumferential direction; and
respective static pressure gauges are disposed in the center portion of the static pressure diaphragm and an edge portion thereof that is disposed in the circumferential direction.

4. The pressure sensor as set forth in claim 3, wherein:
the static pressure diaphragm is formed in a rectangular shape.

5. The pressure sensor as set forth in claim 2, wherein:
the static pressure diaphragm is formed in a square shape; and
static pressure gauges are provided in respective array directions along two adjacent edges of the static pressure diaphragm.

* * * * *